(12) United States Patent
Huang et al.

(10) Patent No.: US 12,463,250 B2
(45) Date of Patent: Nov. 4, 2025

(54) ELECTROCHEMICAL CELL HAVING ELECTROLYTE WITH POLYMER LOCALIZED ON ELECTRODE SURFACE

(71) Applicant: Factorial Inc., Woburn, MA (US)

(72) Inventors: Yiqing Huang, Lexington, MA (US); Jia Du, Burlington, MA (US); Dong Ren, Woburn, MA (US)

(73) Assignee: Factorial Inc., Billerica, MA (US)

( * ) Notice: Subject to any disclaimer, the term of this patent is extended or adjusted under 35 U.S.C. 154(b) by 497 days.

(21) Appl. No.: 18/176,754

(22) Filed: Mar. 1, 2023

(65) Prior Publication Data

US 2023/0282883 A1 Sep. 7, 2023

Related U.S. Application Data

(60) Provisional application No. 63/316,749, filed on Mar. 4, 2022.

(51) Int. Cl.
*H01M 10/0565* (2010.01)

(52) U.S. Cl.
CPC ............ *H01M 10/0565* (2013.01); *H01M 2300/0082* (2013.01)

(58) Field of Classification Search
CPC .............. H01M 10/0565; H01M 2300/0082
USPC ............................................. 429/309
See application file for complete search history.

(56) References Cited

U.S. PATENT DOCUMENTS

| | | | |
|---|---|---|---|
| 5,294,501 A | 3/1994 | Chaloner-Gill | |
| 5,691,080 A | 11/1997 | Derzon et al. | |
| 6,322,924 B1 | 11/2001 | Hirahara et al. | |
| 6,562,513 B1 | 5/2003 | Takeuchi et al. | |
| 6,822,065 B1 | 11/2004 | Sanchez et al. | |
| 7,078,131 B2 | 7/2006 | Noh | |
| 8,765,295 B2 | 7/2014 | West et al. | |
| 9,017,882 B2 | 4/2015 | Hudson et al. | |
| 10,347,939 B2 | 7/2019 | Choi et al. | |
| 2003/0180624 A1 | 9/2003 | Oh et al. | |
| 2003/0207179 A1 | 11/2003 | Uetani et al. | |
| 2004/0043298 A1 | 3/2004 | Lee | |
| 2012/0129045 A1 | 5/2012 | Gin et al. | |
| 2019/0280332 A1* | 9/2019 | Kim | C07D 333/36 |
| 2019/0305298 A1 | 10/2019 | Chae et al. | |
| 2020/0052332 A1 | 2/2020 | Yi et al. | |

(Continued)

FOREIGN PATENT DOCUMENTS

| | | |
|---|---|---|
| JP | 3575108 B2 | 10/2004 |
| JP | 2005263988 A | 9/2005 |
| WO | 2020243948 | 12/2020 |

OTHER PUBLICATIONS

Benziger J, Chia E, Karnas E, Moxley J, Teuscher C, Kevrekidis IG. The stirred tank reactor polymer electrolyte membrane fuel cell. AIChE Journal. 2004; 50(8):1889-900.

*Primary Examiner* — James M Erwin (57) ABSTRACT

Disclosed is an electrochemical cell having a polymer solid electrolyte comprising a polymer localized on surface of an electrode. In one aspect, the localized polymer physically decreases or prevents exposure of freshly cracked electrode to a flammable solvent under extreme conditions, thus leading to an improved safety profile of the cell. In one aspect, the disclosure provides a polymer solid electrolyte comprising a polymer localized on surface of an electrode. Methods for preparing the same are also disclosed.

18 Claims, 2 Drawing Sheets

(56) References Cited

U.S. PATENT DOCUMENTS

| | | |
|---|---|---|
| 2020/0144665 A1 | 5/2020 | Huang et al. |
| 2020/0144667 A1 | 5/2020 | Huang et al. |
| 2020/0203758 A1 | 6/2020 | Park et al. |
| 2021/0020944 A1 | 1/2021 | Tu et al. |
| 2021/0151794 A9 | 5/2021 | Huang et al. |
| 2021/0151795 A9 | 5/2021 | Huang et al. |
| 2021/0384552 A1 | 12/2021 | Shukla et al. |

* cited by examiner

ELECTROCHEMICAL CELL HAVING ELECTROLYTE WITH POLYMER LOCALIZED ON ELECTRODE SURFACE

CROSS-REFERENCE

The present application claims benefit of U.S. Ser. No. 63/316,749, filed Mar. 4, 2022, the entire content of which is incorporated herein by reference in its entirety. Throughout this application, various references or publications are cited.

FIELD

The present disclosure generally relates to polymer electrolytes comprising polymer localized on electrode surface for electrochemical cells and devices such as for batteries, capacitors, sensors, condensers, electrochromic elements, photoelectric conversion elements.

BACKGROUND

With the rapid advancement in energy densities of batteries, safety becomes more and more important. It is critical to ensure the battery safety and no fire or rupture even under extreme abuse conditions, for example, short circuit due to incorrect use or accident. The present disclosure provides an effective approach to secure the safety by adjusting the internal resistance via a new designed electrolyte/electrode interface, particularly, a polymer electrolyte with polymer localized on the electrode surface.

SUMMARY

In one aspect, the present disclosure provides electrochemical cells, comprising a cathode, an anode, and a polymer solid electrolyte (alternatively solid polymer electrolyte), wherein the polymer solid electrolyte comprises an electrolyte salt and a polymer localized on the surface of cathode or anode. Without wishing to be bound by any theory, the localized polymer physically decreases or prevents exposure of freshly cracked electrode materials to electrolyte under extreme conditions, thus reducing or inhibiting the exothermic reaction when the electrode is cracked.

In one aspect, the present disclosure provides an electrochemical cell comprising:
  a) an electrode; and
  b) a polymer solid electrolyte, comprising:
    i) an electrolyte salt;
    ii) a solvent; and
    iii) a polymer polymerized from a mixture containing the electrolyte salt, the solvent, and a monomer, wherein the polymer has at least a first portion localized on surface of the electrode thereby decreasing exposure of the electrode to the solvent upon cracking of the electrode.

In one aspect, this disclosure provides a method for preparing the cell, comprising:
  a) preparing a base solution comprising an electrolyte salt, a solvent and a monomer;
  b) loading the base solution onto an electrode followed by a resting, after which at least a portion of the monomer stays on the surface of the electrode; and
  c) after the resting, polymerizing the monomer therein into a polymer, thereby obtaining an electrochemical cell which contains a polymer *soli* electrolyte comprising at least a portion of the polymer localized on surface of the electrode.

In one aspect, the present disclosure provides an electrochemical cell, comprising:
  a) an electrode; and
  b) a polymer solid electrolyte, comprising:
    i. a first polymer localized on a surface of the electrode, wherein the first polymer is synthesized from a first mixture containing a first monomer, and
    ii. a second polymer located in pores of the electrode, wherein the second polymer is synthesized from a second mixture containing a second monomer.

The method for preparing the electrochemical devices or cells may comprise:
  a) preparing a first mixture comprising a first monomer;
  b) preparing a second mixture comprising a second monomer;
  c) loading the second mixture onto an electrode followed by a first resting which allows a full diffusion of the second monomer into pores of the electrode;
  d) loading the first mixture onto the electrode after loading the second mixture followed by a second resting; and
  e) after the second resting, polymerizing the first and second monomers on the electrode into a first and second polymers, respectively, thereby obtaining an electrochemical cell which contains a polymer solid electrolyte comprising both the first and second polymers, wherein the second polymer is located in pores of the electrode while the first polymer is localized on surface of the electrode.

DETAILED DESCRIPTION

The present disclosure provides systems and methods that effectively enhance cell safety performance without sacrificing electrochemical performance.

In one aspect, the present disclosure provides electrochemical cells having a polymer solid electrolyte comprising a polymer localized on the surface of cathode or anode. In one aspect, the present disclosure provides a polymer solid electrolyte with a polymer localized on an electrode surface.

In one embodiment, the polymer is formed from a composition comprising a monomer.

In one embodiment, the monomer comprises one or more polymerizable terminals. In some embodiments, a monomer is polymerized or crosslinked via a radical polymerization. In some embodiments, a monomer is polymerized or crosslinked via a ring-opening polymerization. In some embodiments, the polymerizable terminals include carbon-carbon double bond (C=C), such as vinyl (—CH=CH$_2$), carbon-carbon triple bond (CC), carboxyl (—COOH), hydroxyl (—OH), amine, epoxy, thiol (—SH), and any substituted forms thereof. In some embodiments, polymerization refers to crosslinking when it involves formation of crosslinking points.

In one embodiment, the monomer is a monomer for ring opening polymerization and has a formula as follows:

and any substituted form thereof, wherein x is an integer ranging from 1 to 1000.

In one embodiment, the monomer for ring opening polymerization is selected from the group consisting of:

In one embodiment, the monomer for ring opening polymerization comprises an optionally substituted oxirane ring, oxetane ring, furan ring, aziridine ring, and azetidine ring.

In one embodiment, the monomer contains a structure including —O—, —NR$^c$—, —S—, —C(=O)—, —C(=O)O—, —C(=O)NR$^c$—, —C(=O)S—, —OC(=O)O—, —NR$^c$C(=O)O—, —NR$^c$C(=O)NR$^c$—, —S(=O)—, —S(=O)$_2$—, —OS(=O)$_3$—, —OS(=O)$_2$O—, —NR$^c$S(=O)$_2$—, —NR$^c$S(=O)$_2$NR$^c$—, —OS(=O)$_2$NR$^c$—, C$_{1-6}$ alkylenyl, C$_{2-6}$ alkenylenyl, C$_{2-6}$ alkynylenyl, C$_{6-14}$ arylenyl, 5- to 14-membered heteroarylenyl, C$_{3-10}$ carbocyclenyl, or 3- to 10-membered heterocyclenyl, wherein the alkylenyl, alkenylenyl, alkynylenyl, arylenyl, heteroarylenyl, carbocyclenyl, or heterocyclenyl is optionally substituted with halogen, —CN, —NO$_2$, C$_{1-6}$ alkyl, C$_{1-6}$ haloalkyl, C$_{1-6}$ hydroxyalkyl, C$_{1-6}$ aminoalkyl, C$_{2-6}$ alkenyl, C$_{2-6}$ alkynyl, C$_{6-14}$ aryl, 5- to 14-membered heteroaryl, C$_{3-10}$ carbocyclyl, 3- to 10-membered heterocyclyl, —SR$^b$, —S(=O)R$^a$, —S(=O)$_2$R$^a$, —S(=O)$_2$OR$^b$, —S(=O)$_2$NR$^c$R$^a$, —NR$^c$R$^a$, —NR$^c$S(=O)$_2$R$^a$, —NR$^c$S(=O)$_2$R$^a$, —NR$^c$S(=O)$_2$OR$^b$, —NR$^c$S(=O)$_2$NR$^c$R$^a$, —NR$^b$C(=O)NR$^c$R$^a$, —NR$^b$C(=O)R$^a$, —NR$^b$C(=O)OR$^b$, —OR$^b$, —OS(=O)$_2$R$^a$, —OS(=O)$_2$OR$^b$, —OS(=O)$_2$NR$^c$R$^a$, —OC(=O)R$^a$, —OC(=O)OR$^b$, —OC(=O)NR$^c$R$^a$, —C(=O)R$^a$, —C(=O)OR$^b$, or —C(=O)NR$^c$R$^a$; wherein R$^a$, R$^b$, R$^c$, and R$^d$ are independently C$_{1-6}$ alkyl, C$_{1-6}$ haloalkyl, C$_{1-6}$ hydroxyalkyl, C$_{1-6}$ aminoalkyl, C$_{2-6}$ alkenyl, C$_{2-6}$ alkynyl, C$_{3-10}$ carbocyclyl, 3- to 10-membered heterocyclyl, C$_{6-14}$ aryl, or 5- to 14-membered heteroaryl, wherein the alkyl, haloalkyl, hydroxyalkyl, aminoalkyl, alkenyl, alkynyl, carbocyclyl, heterocyclyl, aryl, and heteroaryl is optionally substituted with one or more oxo, halogen, —CN, —OH, —OMe, —NH$_2$, —C(=O)Me, —C(=O)OH, —C(=O)OMe, C$_{1-6}$ alkyl, or C$_{1-6}$ haloalkyl.

In one embodiment, R$^c$ and R$^d$, together with the hetero atom (such as N, O, S, P), form a 3- to 10-membered heterocyclyl, wherein the heterocyclyl is optionally substituted with one or more oxo, halogen, —CN, —OH, —OMe, —NH$_2$, —C(=O)Me, —C(=O)OH, —C(=O)OMe, C$_{1-6}$ alkyl, or C$_{1-6}$ haloalkyl.

In certain embodiments, the monomer comprises a structure of —XC(=O)CR$^3$=C(R$^4$)$_2$, wherein X is independently O or NR$^e$, R$^e$ is independently H or C$_{1-6}$ alkyl, and each R$^3$ and R$^4$ is independently H or C$_{1-6}$ alkyl.

In certain embodiments, the monomer comprises one or more functional groups including without limitation:

In certain embodiments, the monomer is selected from:

-continued

In some embodiments, the monomer is selected from the group consisting of poly(ethylene glycol) diacrylate (with a number average molecular weight (Mn) in a range from 500 to 50,000 Dalton), poly(ethylene glycol) dimethacrylate (with an Mn in a range from 500 to 50,000 Dalton), triethylene glycol dimethacrylate (TEGDMA), pentaerythritol tetraacrylate (PETA), pentaerythritol tetramethacrylate (PETMA), tris[2-(acryloyloxy)ethyl] isocyanurate (TAEI), di(trimethylolpropane) tetraacrylate (Di-TMPTA), trimethylolpropane propoxylate triacrylate, trimethylolpropane trimethacrylate, pentaerythritol triacrylate, dipentaerythritol hexaacrylate, pentaerythritol tetrakis(3-mercaptopropionate), trimethylolpropane tris(3-mercaptopropionate) and a combination thereof. In some embodiments, poly(ethylene glycol) diacrylate has an Mn of 500, 700, 1000, 2000, 5000, 10,000, 20,000, 50,000, or 100,000 Dalton. In some embodiments, poly(ethylene glycol) dimethacrylate has an Mn of 500, 700, 1000, 2000, 5000, 10,000, 20,000, 50,000, or 100,000 Dalton.

Without wishing to be bound by any theory, it is believed that groups such as urea, urethane, or carbamate contain both hydrogen bond donors and acceptors, may lead to improvements in properties such as mechanical and/or electrochemical properties of the polymer electrolyte. For instance, urea linkers with rigid bonding may help to improve mechanical strength. In addition, the hydrogen bonds may help to dissociate lithium salts, which may lead to improved ionic conductivity.

As such, in some embodiments, groups such as urea, urethane, or carbamate may be present in the monomer and/or the polymer. The urea and/or carbamate may be provided within the polymer using different combinations of functional groups, such as amine and carbamate, or alcohol and isocyanate, during formation of the polymer. Such groups may be present next to each other, and/or some of the groups may be separated by spacer groups, e.g., between the urea and/or carbamate, and an acrylate.

In certain embodiments, the polymer is formed from a composition comprising a first monomer and a second monomer present at a weight ratio of about 1:10 or less, about 1:9 or less, about 1:8 or less, about 1:7 or less, about 1:6 or less, about 1:5 or less, about 1:4 or less, about 1:3 or less, about 1:2 or less, about 1:1 or less.

In certain embodiments, the polymer is formed from a composition comprising a first monomer and a second monomer present at a weight ratio of about 1:10 or greater, about 1:9 or greater, about 1:8 or greater, about 1:7 or greater, about 1:6 or greater, about 1:5 or greater, about 1:4 or greater, about 1:3 or greater, about 1:2 or greater, about 1:1 or greater.

Combinations of the above-recited ranges for the weight ratio are also contemplated (e.g., about 1:10 to about 8:1, about 1:10 to about 9:1 or about 1:10 to about 10:1, etc.)

In certain embodiments, the polymer is formed from a composition comprising a first monomer and a second monomer present at a weight ratio of about 1:2 to about 1:3.

In certain embodiments, (the first monomer+the second monomer)/the electrolyte salt are present at a weight ratio of about 20:1 or less, about 18:1 or less, about 16:1 or less, about 14:1 or less, about 12:1 or less, about 10:1 or less, about 8:1 or less, about 6:1 or less, about 5:1 or less, about 4:1 or less, about 3:1 or less, about 2:1 or less, or about 1:1 or less.

In certain embodiments, (the first monomer+the second monomer)/the electrolyte salt are present at a weight ratio of about 20:1 or greater, about 18:1 or greater, about 16:1 or greater, about 14:1 or greater, about 12:1 or greater, about 10:1 or greater, about 8:1 or greater, about 6:1 or greater, about 5:1 or greater, about 4:1 or greater, about 3:1 or greater, about 2:1 or greater, or about 1:1 or greater.

Combinations of the above-recited ranges for the weight ratio are also contemplated (e.g., about 1:1 to about 18:1, about 1:1 to about 19:1 or about 1:1 to about 20:1, etc.)

In some embodiments, the polymer is localized on an electrode surface by a single step filling process. As used herein, "localized" means the polymer or a portion of the polymer stays on surface of an electrode. A mixture containing a monomer is applied to an electrode surface followed by a resting. After the resting, at least a portion of the monomer stays on the electrode surface. In some embodiments, the resting only leads to a restricted diffusion of the monomer into pores of the electrode. After the resting, a polymerization is conducted to convert the monomer into a polymer and at least a portion of the polymer is localized on the electrode surface.

In some embodiments, the polymer is localized on electrode surface by a 2-step filling process, i.e., a first and second fillings by a second and first mixtures, respectively. Each mixture contains a monomer. In some embodiments, the first mixture has a viscosity higher than the second mixture. In some embodiments, the first mixture has a monomer concentration higher than the second mixture. In the first filling, the second mixture is applied onto an electrode surface followed by a first resting, e.g., several days at room temperature, which allows a full diffusion of the monomer and other ingredients such as solvent and electrolyte salt, if any, into pores of the electrode. After the first filling, the first mixture is then applied onto the electrode followed by a second resting, which is relatively shorter than the first resting in general. The second resting allows a restricted diffusion of the monomer. After the second resting, at least a portion of the monomer stays on the electrode surface. After the second resting, a polymerization is conducted to polymerize the monomer into a polymer and at least a portion of the polymer is localized on the electrode surface. In some embodiments, the pores of the electrode are filled with a small fraction of the polymer. In some embodiments, the first mixture for the second filling contains a major portion of the monomer.

In some embodiments, the first mixture for the second filling contains all the monomer while the second mixture for the first filling does not contain any monomers. After the first resting, the electrode pores are at least partially filled with a mixture containing an electrolyte salt and a solvent. After the polymerization, at least a portion of the polymer is localized on the electrode surface. In some embodiments, a portion of the polymer is located in the electrode pores. In some embodiments, a minor portion of the polymer is located in the electrode pores while a major portion of the polymer is localized on electrode surface. In some embodiments, there is no polymer in the electrode pores.

In some embodiments, the electrode is first filled with a second mixture containing a second monomer followed with a first resting, and, in the second filling, a first mixture containing a first monomer is applied onto the electrode followed by a second resting. The first resting, usually several days at room temperature, allows the electrode pores at least partially filled with the second mixture. The second resting allows a restricted diffusion of the first monomer into the electrodes. After the second resting, at least a portion of the first monomer stays on the electrode surface. In some embodiments, the first mixture has a viscosity higher than the second mixture. In some embodiments, the first mixture has a monomer concentration higher than the second mixture. In some embodiments, the first monomer in the first mixture has a diffusion coefficient in comparison with the second monomer in the second mixture. After the polymerization, the first and second monomers are polymerized into a first and second polymers. In some embodiments, the polymer solid electrolyte can have the second polymer located in the pores of the electrode (e.g., from the first filling step) and the second polymer localized on the surface of the electrode (e.g., from the second filling step). In some embodiments, there is also a portion of the second polymer on the electrode surface. In some embodiments, the polymer localized on the electrode surface is a copolymer of the first and second monomers. In some embodiments, the polymer localized on the electrode surface is a mixture of the first and second polymers. In one embodiment, the second polymer localized on the electrode surface has an amount of polymer higher than the first polymer located in the electrode pores. In some embodiments, the first mixture may include multiple monomers. In some embodiments, the second mixture may include multiple monomers.

In some embodiments, the first mixture comprises a first electrolyte salt and a first solvent. In some embodiments, the second mixture comprises a second electrolyte salt and a second solvent. In some embodiments, the first electrolyte salt in the first mixture is the same or different from the second electrolyte salt in the second mixture. In some embodiments, when the first electrolyte salt and the second salt are the same, their concentrations in the first and second mixtures may be the same or different. In some embodiments, the first solvent in the first mixture is the same or different from the second solvent in the second mixture. In some embodiments, when the first solvent and the second solvent are the same, their concentrations in the first and second mixtures may be the same or different.

In certain embodiments, the first resting lasts for at least 1 day, at least 2 days, at least 5 days, at least 7 days, at least 10 days, at least 14 days, or at least 20 days. In some embodiments, the second resting is no more than 48 hours, no more than 36 hours, no more than 24 hours, no more than 12 hours, no more than 8 hours, no more than 6 hours, no more than 4 hours, no more than 3 hours, no more than 2 hours, or no more than 1 hour. In some embodiments, the pouch cell after the second resting is heated to a temperature, which allows the polymerization of the monomer or monomers therein. After the polymerization, the polymer has a relatively higher concentration on the surface of the electrode rather than the pores and/or voids among electrode particles. In some embodiments, the mixture for the first filling contains no more than 50 wt %, no more than 40 wt %, no more than 35 wt %, no more than 30 wt %, no more than 25 wt %, no more than 20 wt %, no more than 15 wt %, no more than 10 wt %, no more than 7.5 wt %, no more than 5 wt %, no more than 2.5 wt %, no more than 1 wt %, or no more than 0.5 wt % of the total amount of the monomer or monomers in both fillings. In some embodiments, the mixture for the second filling contains no less than 50 wt %, no less than 60 wt %, no less than 70 wt %, no less than 80 wt %, no less than 85 wt %, no less than 90 wt %, no less than 95 wt %, no less than 97.5 wt %, or 100 wt % of the total amount of the monomer or monomers in both fillings. In some embodiments, the first or second polymer may have a linear, branched, or crosslinked structure.

In some embodiments, the monomer in the first filling is the same as or different from the one in the second filling. In some embodiments, the first polymer has a relatively more flexible structure than that of the second polymer. In some embodiments, the first polymer localized on the electrode surface (e.g., from the second filling) has a greater amount than the second polymer located in the electrode pores (e.g., from the first filling).

In some embodiments, the solution for the 2-step filling or the solution for the single step filling has a certain viscosity which allows a limited or restricted diffusion of the monomer during the corresponding resting at room temperature. In some embodiments, the dynamic viscosity of the solution is at least 50 centipoise (cP), at least 75 cP, 100 cP, at least 150 cP, at least 200 cP, at least 300 cP, at least 400 cP, at least 500 cP, at least 750 cP, at least 1000 cP, or at least 1200 cP. In some embodiments, to ensure the processibility and a good contact between electrode and polymer electrolyte, the dynamic viscosity cannot exceed a certain level and is no more than 2000 cP, no more than 2500 cP, no more than 3000 cP, no more than 3500 cP, or no more than 5000 cP. In some embodiments, the dynamic viscosity of the second solution for the 2-step filling or the solution for the 1-step filling is in a range from 50 to 1200 cP, from 50 to 1000 cP, from 50 to 750 cP, from 50 to 500 cP, from 75 to 1200 cP, from 75 to 1000 cP, from 75 to 750 cP, from 75 to 500 cP, from 100 to 1200 cP, from 100 to 1000 cP, from 100 to 750 cP, from 100 to 500 cP, from 150 to 1200 cP, from 150 to 1000 cP, from 150 to 750 cP, or from 150 to 500 cP. In some embodiments, the dynamic viscosity is measured by a rotational viscometer, viscosity cup, falling ball viscometer, or glass capillary viscometer.

In some embodiments, the mixture or solution for a limited diffusion has a relatively high monomer concentration. In some embodiments, the monomer has a concentration in a range from 10 wt % to 40 wt %, from 10 wt % to 35 wt %, from 10 wt % to 30 wt %, from 10 wt % to 25 wt %, from 10 wt % to 20 wt %, from 5 wt % to 40 wt %, from 5 wt % to 35 wt %, from 5 wt % to 30 wt %, from 5 wt % to 25 wt %, or from 5 wt % to 20 wt %. In some embodiments, the mixture or solution for the second filling has a relatively low concentration and it has a monomer concentration no more than 7.5 wt %, no more than 5.0 wt %, no more than 4 wt %, no more than 3 wt %, no more than 2 wt %, or no more than 1 wt %. In some embodiments, the first filling does not contain any monomers.

In some embodiments, the monomer is polymerized at a temperature of 50-80° C. for a period in a range from 2 to 10 hours. In one embodiments, the polymer is in situ prepared from a mixture containing the monomer, an electrolyte salt and optionally a solvent.

In one embodiment, the polymer electrolyte comprises an electrolyte salt and a plasticizer.

In certain embodiments, the electrolyte salt comprises an alkali metal salt. In certain embodiments, the alkali metal salt is a lithium salt. Non-limiting specific lithium salts include lithium perchlorate ($LiClO_4$), lithium nitrate ($LiNO_3$), lithium hexafluorophosphate ($LiPF_6$), lithium borofluoride ($LiBF_4$), lithium hexafluoroarsenide ($LiAsF_6$), lithium trifluorometasulfonate ($LiCF_3SO_3$), lithium bisperfluoro-ethysulfonylimide (LiBETI), lithium bis(fluorosulfonyl)imide (LiFSI), lithium bis(trifluoromethanesulfonyl)imide ($LiN(CF_3SO_2)_2$, LiTFSI), lithium bis(oxalato)borate (LiBOB), lithium difluoro(oxalato)borate (LiDFOB), lithium fluoroalkyl-phosphates ($Li[PF_x(C_yF_{2y+1-z}H_z)_{6-x}]$) ($1 \leq x \leq 5$, $1 \leq y \leq 8$, and $0 \leq z \leq 2y-1$), lithium fluorophosphate ($Li_2PO_3F$), lithium difluorophosphate (LiDFP), lithium difluoro(bisoxalato)phosphate ($LiC_4PO_8F_2$), and lithium tetrafluoro oxalato phosphate ($LiC_2PO_4F_4$), lithium tris(trifluoromethanesulfonyl)methide ($LiC(CF_3SO_2)_3$), LiF, LiCl, LiBr, LiI, $Li_2SO_4$, $Li_3PO_4$, $Li_2CO_3$, LiOH, lithium acetate, lithium trifluoromethyl acetate, lithium oxalate and a mixture thereof.

In certain embodiments, the lithium salt comprises LiTFSI, LiFSI, LiBOB, $LiPF_6$, $LiBF_4$, or LiDFOB. In certain embodiments, the electrolyte salt comprises a quaternary ammonium salt, a quaternary phosphonium salt, or a transition metal salt.

In one embodiment, the electrolyte salt has a concentration in a range from 10 wt % to 80 wt % in the mixture for the first filling, the mixture for the second filling, or in the polymer solid electrolyte after polymerization. In some embodiments, the electrolyte salt has a concentration in a range from 10 wt % to 75 wt %, from 10 wt % to 70 wt %, from 10 wt % to 65 wt %, from 10 wt % to 60 wt %, from 10 wt % to 55 wt %, from 10 wt % to 50 wt %, from 10 wt % to 45 wt %, from 10 wt % to 40 wt %, from 10 wt % to 35 wt %, from 10 wt % to 30 wt %, or 10 wt % to 25 wt %, in the mixture for the first or second filling. In some embodiments, the electrolyte salt has a concentration in a range from 15 wt % to 80 wt %, from 25 wt % to 80 wt %, from 30 wt % to 80 wt %, from 35 wt % to 80 wt %, from 40 wt % to 80 wt %, from 45 wt % to 80 wt %, from 50 wt % to 80 wt %, from 55 wt % to 80 wt %, from 60 wt % to 80 wt %, from 65 wt % to 80 wt %, or from 70 wt % to 80 wt % in the mixture for the first or second filling.

In some embodiments, the mixture comprises a solvent to dissolve lithium salts, improve processability, dispersion and/or controlling the ionic conductivity and mechanical strength. In some embodiments, the solvent can be a small molecule (i.e., having a molecular weight of less than 1 kDa), a nitrile, an oligoether, a carbonate, a phosphate, a sulfone, an ester, an ionic liquid, or the like. Non-limiting specific solvents include diethyl ether, dimethoxy methane, diethoxy methane, dimethoxy ethane, 1,2-diethoxyethane, 1,1-diethoxyethane, 1,1-dipropoxyethane, 1,2-dipropoxyethane, diethylene glycol, 2-(2-ethoxyethoxy)ethanol, diethylene glycol dimethyl ether, diethylene glycol diethyl ether, diethylene glycol dibutyl ether, triethylene glycol, tri(ethylene glycol) monomethyl ether, tri(ethylene glycol) monoethyl ether, tri(ethylene glycol) monobutyl ether, triethylene glycol dimethyl ether, triethylene glycol diethyl ether, triethylene glycol dibutyl ether, tetraethylene glycol, tetra(ethylene glycol) monomethyl ether, tetra(ethylene glycol) monoethyl ether, tetra(ethylene glycol) monobutyl ether, tetraethylene glycol dimethyl ether, tetraethylene glycol diethyl ether, tetraethylene glycol dibutyl ether, tetrahydrofuran, dioxolane, tetrahydropyran, 1,4-dioxane, 1,3-dioxane, ethylene carbonate, diethyl carbonate, dimethyl carbonate, ethyl methyl carbonate, propylene carbonate, fluoroethylene carbonate, vinylene carbonate, succinonitrile, glutaronitrile, hexanenitrile, malononitrile, dimethyl sulfoxide, 1,3-propane sultone, sulfolane, ethyl vinyl sulfone, vinyl sulfone, methyl vinyl sulfone, phenyl vinyl sulfone, N-propyl-N-methylpyrrolidinium bis(fluorosulfonyl)imide, N-butyl-N-methylpyrrolidinium bis(fluorosulfonyl)imide, N-propyl-N-methylpiperidinium bis(fluorosulfonyl)imide, 1-methyl-1-(2-methoxyethyl)pyrrolidinium bis(fluorosulfonyl)imide, 1-ethyl-3-methylimidazolium bis(fluorosulfonyl)imide, trimethyl phosphate, triethyl phosphate, poly(ethylene oxide), or any combination thereof. In some embodiments, the solvent is a plasticizer.

In certain embodiments, the solvent is an ionic liquid. In certain embodiments, the ionic liquid comprises one or more cations of ammonium, imidazolium, piperidinium, pyridinium, pyrrolidinium, phosphonium, sulfonium, guanidinium, diethanolammonium, alkyl-ammonium, alkyl-imidazolium, alkyl-piperidinium, alkyl-pyridinium, alkyl-pyrrolidinium, alkyl-phosphonium, alkyl-sulfonium, alkyl-guanidinium, and alkyl-diethanolammonium; and one or more anions of nitrate, sulfonate, methanesulfonate, alkyl-sulfonate, fluoroalkyl-sulfonate, sulfate, methylsulfate, alkyl-sulfate, fluoroalkyl-sulfate, phosphate, methylphosphate, alkyl phosphate, fluoroalkyl-phosphate, phosphinate, methylphosphinate, alkyl-phosphinate, fluoroalkyl-phosphinate, halogen, trifluoromethanesulfonate, dihydrogen phosphate, fluoromethylsulfonyl)imide, alkyl-imide, alkylamide, tetrafluoroborate, hexafluoro phosphate, formate, acetate, trifluoroacetate, dicyanamide, decanoate, alkyl-methide, and alkyl-borate.

In certain embodiments, the ionic liquid comprises ethyl ammonium nitrate, 1-ethyl-3-methylimidazolium ethyl sulfate, 1-ethyl-3-methylimidazolium tetrafluoroborate, 1-butyl-3-methylimidazolium trifluoromethanesulfonate, 1-ethyl-3-methylimidazolium methanesulfonate, 1-butylpyridinium bromide, and 2-hydroxy dimethylammonium methanesulfonate.

In some embodiments, the mixture for the first or second filing comprises a solvent at a weight percentage from 5 wt % to 85 wt %, from 5 wt % to 80 wt %, from 5 wt % to 75 wt %, 5 wt % to 70 wt %, 5 wt % to 65 wt %, 5 wt % to 60 wt %, 5 wt % to 55 wt %, 5 wt % to 50 wt %, 5 wt % to 45 wt %, 5 wt % to 40 wt %, 5 wt % to 35 wt %, 5 wt % to 30 wt %, from 5 wt % to 25 wt %, or from 5 wt % to 20 wt % based on the total weight of the mixture. In some embodiments, the mixture comprises a solvent at a weight percentage from 10 wt % to 85 wt %, from 15 wt % to 85 wt %, from 20 wt % to 85 wt %, 25 wt % to 85 wt %, 30 wt % to 85 wt %, 35 wt % to 85 wt %, 40 wt % to 85 wt %, 45 wt % to 85 wt %, 50 wt % to 85 wt %, 50 wt % to 85 wt %, 55 wt % to 85 wt %, 60 wt % to 85 wt %, from 65 wt % to 85 wt %, or from 70 wt % to 85 wt % based on the total weight of the mixture for the first or second filing. In some embodiments, the mixture comprises a solvent at a weight percentage from 10 wt % to 80 wt %, from 15 wt % to 80 wt %, from 15 wt % to 75 wt %, from 20 wt % to 75 wt %, from 25 wt % to 75 wt %, from 30 wt % to 75 wt %, from 35 wt % to 75 wt %, from 40 wt % to 75 wt %, from 45 wt % to 75 wt %, from 50 wt % to 75 wt %, or from 55 wt % to 75 wt %, based on the total weight of the mixture for the first or second filing.

In certain embodiments, the monomer has a molecular weight of about 2 kDa or less, about 1.9 kDa or less, about 1.8 kDa or less, about 1.7 kDa or less, about 1.6 kDa or less, about 1.5 kDa or less, about 1.4 kDa or less, about 1.3 kDa or less, about 1.2 kDa or less, about 1.1 kDa or less, about 1.0 kDa or less, about 0.9 kDa or less, about 0.8 kDa or less, about 0.7 kDa or less, or about 0.6 kDa or less.

In certain embodiments, the monomer has a molecular weight of about 0.5 kDa or greater, about 0.6 kDa or greater, about 0.7 kDa or greater, about 0.8 kDa or greater, about 0.9 kDa or greater, about 1.0 kDa or greater, about 1.1 kDa or greater, about 1.2 kDa or greater, about 1.3 kDa or greater, about 1.4 kDa or greater, about 1.5 kDa or greater, about 1.6 kDa or greater, about 1.7 kDa or greater, about 1.8 kDa or greater, or about 1.9 kDa or greater.

Combinations of the above-recited ranges for the molecular weight are also contemplated (e.g., about 0.5 kDa to about 1.8 kDa, about 0.5 kDa to about 1.9 kDa, about 0.5 kDa to about 2.0 kDa, or about 0.5 kDa to about 1.8 kDa, etc.)

In one aspect, the present disclosure provides an assembly of a polymer solid electrolyte on an electrode, wherein the polymer solid electrolyte comprises a polymer localized on surface of the electrode. In one aspect, the present disclosure provides an electrochemical cell or device comprising the polymer solid electrolyte as described herein.

In certain embodiments, the electrochemical cell is a battery, a lithium-ion battery, or lithium-ion solid-state battery.

As discussed above, the present disclosure provides a polymer solid electrolyte comprising a copolymer localized on the surface of the electrode. Methods for preparing the polymer solid electrolyte may include:
  i) mixing the first monomer, the second monomer, and a liquid electrolyte salt, thereby forming a mixture comprising the first monomer, the second monomer, and the liquid electrolyte; and
  ii) loading the mixture to an electrode surface followed by a resting,
  iii) polymerizing the monomers in the mixture into a copolymer, thereby forming a solid polymer electrolyte having the copolymer localized on the surface of the electrode.

In certain embodiments, the mixture is substantially free of solvent. In certain embodiments, the mixture comprises a solvent. In certain embodiments, the mixture is a slurry.

In certain embodiments, the methods further comprise adding the mixture to a mold prior to the polymerization.

In certain embodiments, the monomers are polymerized under UV light, in the presence of an initiator (e.g., 2,2'-azobis(2-methylpropionitrile), at an elevated temperature, or any combination thereof.

In certain embodiments, the polymerization is performed at a temperature of at least 20° C. but no higher than 100° C.

The electrochemical cells disclosed herein may include a cathode, an anode, and a polymer solid electrolyte, wherein the polymer solid electrolyte comprises an electrolyte salt and a polymer localized on the surface of electrode.

In certain embodiments, the electrochemical cell includes a separator disposed between the anode and the cathode, and that the anode is disposed on an anode current collector (e.g., copper) and the cathode is placed on a cathode current collector (e.g., aluminum).

In some embodiments, the electrochemical cell exhibits a safety profile. In some embodiments, during an external short circuit test with an external resistance, the electrochemical cell exhibits a lower maximum temperature which usually indicates a better safety profile. In some embodiments, the external resistance is in a range from 0.005 to 0.1 Ohms, from 0.01 to 0.1 Ohms, from 0.015 to 0.08 Ohms, from 0.02 to 0.08 Ohms, or from 0.04 to 0.08 Ohms. In some embodiments, during an external short circuit test with an external resistance, the electrochemical cell exhibits a maximum temperature no higher than 35%, no higher than 40%, no higher than 45% no higher than 50%, no higher than 55%, no higher than 60%, no higher than 70%, or no higher than 80% of that of an electrochemical cell with no polymer localized on surface of electrode layer. In some embodiments, during an external short circuit test with an external resistance, the electrochemical cell exhibits a lower maximum current, which is also linked to a better safety profile. In some embodiments, during an external short circuit test with an external resistance, the electrochemical cell exhibits a maximum current of at least 2%, at least 2.5%, at least 3%, at least 4%, at least 5%, at least 5%, at least 7.5%, or at least 10% lower than that of an electrochemical cell with no polymer localized on surface of electrode layer.

In certain embodiments, the solid polymer electrolyte is deposited or coated on the surface of the cathode or anode.

In certain embodiments, the polymer solid electrolyte has a thickness in a range from 0.2 to 200 µm. In some embodiment, the polymer solid electrolyte has a thickness in a range from 0.1 to 2000 µm, from 0.2 to 1500 µm, from 0.2 to 1000 µm, from 0.2 to 750 µm, from 0.2 to 500 µm, from 0.2 to 250 µm, from 0.2 to 100 µm, from 0.2 to 50 µm, from 0.2 to 20 µm, from 0.5 to 1000 µm, from 0.5 to 750 µm, from 0.5 to 500 µm, from 0.5 to 200 µm from 0.5 to 100 µm, from 0.5 to 50 µm, from 0.5 to 20 µm, or from 0.5 to 10 µm. In some embodiment, the polymer solid electrolyte has a thickness of about 0.1 mm or greater, 0.2 mm or greater, 0.3 mm or greater, 0.4 mm or greater, 0.5 mm or greater, 0.6 mm or greater, 0.7 mm or greater, 0.8 mm or greater, 0.9 mm or greater, 1.0 mm or greater, 1.1 mm or greater, 1.2 mm or greater, 1.3 mm or greater, 1.4 mm or greater, 1.5 mm or greater, 1.6 mm or greater, 1.7 mm or greater, 1.8 mm or greater, 1.9 mm or greater. In some embodiment, the polymer solid electrolyte has a thickness of about 2.0 mm or greater.

In certain embodiments, the solid polymer electrolyte has a thickness of about 0.1 mm or less, 0.2 mm or less, 0.3 mm or less, 0.4 mm or less, 0.5 mm or less, 0.6 mm or less, 0.7 mm or less, 0.8 mm or less, 0.9 mm or less, 1.0 mm or less, 1.1 mm or less, 1.2 mm or less, 1.3 mm or less, 1.4 mm or less, 1.5 mm or less, 1.6 mm or less, 1.7 mm or less, 1.8 mm or less, 1.9 mm or less, or 2.0 mm or less.

Combinations of the above-recited ranges for the solid polymer electrolyte thickness are also contemplated (e.g., about 0.1 mm to about 1.5 mm, about 0.1 mm to about 1.6 mm, about 0.1 mm to about 1.7 mm, about 0.1 mm to about 1.8 mm, about 0.1 mm to about 1.9 mm, about 0.1 mm to about 2.0 mm, about 1.0 mm to about 1.8 mm, about 1.0 mm to about 1.9 mm, or about 1.0 mm to about 2.0 mm, etc.).

In certain embodiments, the cathode comprises a cathode active material, a conductive agent, or a binder. In certain embodiments, the cathode active materials comprises lithium cobalt oxide (LCO), lithium nickel manganese cobalt oxide (NMC) (e.g., $LiNi_{1/3}Co_{1/3}Mn_{1/3}O_2$ or $LiNi_{0.5}Co_{0.2}Mn_{0.3}O_2$), lithium nickel cobalt manganese aluminum oxide, lithium nickel cobalt aluminum oxide, lithium titanate, metallic lithium, lithium metal oxide, lithium cobalt oxide, lithium manganese oxides (LMO) (e.g., $LiMn_2O_4$ and $LiNi_{0.5}Mn_{1.5}O_4$), lithium iron phosphates (LFP) (e.g., $LiFePO_4$), $LiMnPO_4$, $LiCoPO_4$ (LCP), $Li_2MMn_3O_8$, wherein M is Fe and/or Co, layered Li—Ni—Co—Mn oxides, (NCM), or layered Li—Ni—Co—Al oxides (NCA).

In certain embodiments, the cathode active material comprises LCO, NMC, NCA, LMO, or LFP. In certain embodiments, the conductive agent comprises carbon black, carbon nanotube, or graphene. In certain embodiments, the binder comprises PVDF, PTFE, CMC-SBR, or PVP.

In certain embodiments, the anode comprises an anode active material, a conductive agent, or a binder. In certain embodiments, the anode active material comprises a conducting carbon material or lithium titanium oxide (LTO). In certain embodiments, the conducting carbon material comprises artificial graphite, natural graphite, hard carbon, or LTO. In certain embodiments, the conductive agent comprises carbon black, carbon nanotube, or graphene. In certain embodiments, the binder comprises PVDF, PTFE, CMC-SBR, or PVP.

Definitions

When a range of values is listed, it is intended to encompass each value and sub-range within the range. For example, "$C_{1-6}$ alkyl" is intended to encompass, $C_1$, $C_2$, $C_3$, $C_4$, $C_5$, $C_6$, $C_{1-6}$, $C_{1-5}$, $C_{1-4}$, $C_{1-3}$, $C_{1-2}$, $C_{2-6}$, $C_{2-5}$, $C_{2-4}$, $C_{2-3}$, $C_{3-6}$, $C_{3-5}$, $C_{3-4}$, $C_{4-6}$, $C_{4-5}$, and $C_{5-6}$ alkyl.

When describing the disclosure, which may include compounds, compositions containing such compounds and methods of using such compositions, the following terms, if present, have the following meanings unless otherwise indicated. It should also be understood that when described herein any of the moieties defined forth below may be substituted with a variety of substituents, and that the respective definitions are intended to include such substituted moieties within their scope as set out below. The articles "a" and "an" may be used herein to refer to one or to more than one (i.e., at least one) of the grammatical objects of the article.

"Alkyl" refers to a radical of a straight-chain or branched saturated hydrocarbon group having from 1 to 20 carbon atoms ("$C_{1-20}$ alkyl"). Unless otherwise specified, each instance of an alkyl group is independently optionally substituted, i.e., unsubstituted (an "unsubstituted alkyl") or substituted (a "substituted alkyl") with one or more substituents.

"Alkylene" refers to an alkyl group wherein two hydrogens are removed to provide a divalent radical, and which may be substituted or unsubstituted.

"Alkenyl" refers to a radical of a straight-chain or branched hydrocarbon group having from 2 to 20 carbon atoms, one or more carbon-carbon double bonds (e.g., 1, 2, 3, or 4 carbon-carbon double bonds), and optionally one or more carbon-carbon triple bonds (e.g., 1, 2, 3, or 4 carbon-carbon triple bonds) ("$C_{2-20}$ alkenyl"). Unless otherwise specified, each instance of an alkenyl group is independently optionally substituted, i.e., unsubstituted (an "unsubstituted alkenyl") or substituted (a "substituted alkenyl") with one or more substituents.

"Alkenylene" refers to an alkenyl group wherein two hydrogens are removed to provide a divalent radical, and which may be substituted or unsubstituted. Exemplary unsubstituted divalent alkenylene groups include, but are not limited to, ethenylene (—CH═CH—) and propenylene (e.g., —CH═CHCH₂—, —CH₂—CH═CH—).

"Alkynyl" refers to a radical of a straight-chain or branched hydrocarbon group having from 2 to 20 carbon atoms, one or more carbon-carbon triple bonds (e.g., 1, 2, 3, or 4 carbon-carbon triple bonds), and optionally one or more carbon-carbon double bonds (e.g., 1, 2, 3, or 4 carbon-carbon double bonds) ("$C_{2-20}$ alkynyl"). Unless otherwise specified, each instance of an alkynyl group is independently optionally substituted, i.e., unsubstituted (an "unsubstituted alkynyl") or substituted (a "substituted alkynyl") with one or more substituents.

"Alkynylene" refers to a linear alkynyl group wherein two hydrogens are removed to provide a divalent radical, and which may be substituted or unsubstituted.

The term "heteroalkyl," as used herein, refers to an alkyl group, as defined herein, which further comprises 1 or more (e.g., 1, 2, 3, or 4) heteroatoms (e.g., oxygen, sulfur, nitrogen, boron, silicon, phosphorus) within the parent chain, wherein the one or more heteroatoms is inserted between adjacent carbon atoms within the parent carbon chain and/or one or more heteroatoms is inserted between a carbon atom and the parent molecule, i.e., between the point of attachment. Unless otherwise specified, each instance of a heteroalkyl group is independently unsubstituted (an "unsubstituted heteroalkyl") or substituted (a "substituted heteroalkyl") with one or more substituents.

The term "heteroalkenyl," as used herein, refers to an alkenyl group, as defined herein, which further comprises one or more (e.g., 1, 2, 3, or 4) heteroatoms (e.g., oxygen, sulfur, nitrogen, boron, silicon, phosphorus) wherein the one or more heteroatoms is inserted between adjacent carbon atoms within the parent carbon chain and/or one or more heteroatoms is inserted between a carbon atom and the parent molecule, i.e., between the point of attachment. Unless otherwise specified, each instance of a heteroalkenyl group is independently unsubstituted (an "unsubstituted heteroalkenyl") or substituted (a "substituted heteroalkenyl") with one or more substituents.

The term "heteroalkynyl," as used herein, refers to an alkynyl group, as defined herein, which further comprises one or more (e.g., 1, 2, 3, or 4) heteroatoms (e.g., oxygen, sulfur, nitrogen, boron, silicon, phosphorus) wherein the one or more heteroatoms is inserted between adjacent carbon atoms within the parent carbon chain and/or one or more heteroatoms is inserted between a carbon atom and the parent molecule, i.e., between the point of attachment. Unless otherwise specified, each instance of a heteroalkynyl group is independently unsubstituted (an "unsubstituted heteroalkynyl") or substituted (a "substituted heteroalkynyl") with one or more substituents.

As used herein, "alkylene," "alkenylene," "alkynylene," "heteroalkylene," "heteroalkenylene," and "heteroalkynylene," refer to a divalent radical of an alkyl, alkenyl, alkynyl group, heteroalkyl, heteroalkenyl, and heteroalkynyl group respectively. "Aryl" refers to a radical of a monocyclic or polycyclic (e.g., bicyclic or tricyclic) 4n+2 aromatic ring system (e.g., having 6, 10, or 14 π electrons shared in a cyclic array) having 6-14 ring carbon atoms and zero heteroatoms provided in the aromatic ring system ("$C_{6-14}$ aryl").

"Aryl" also includes ring systems wherein the aryl ring, as defined above, is fused with one or more carbocyclyl or heterocyclyl groups wherein the radical or point of attachment is on the aryl ring. Unless otherwise specified, each instance of an aryl group is independently optionally substituted, i.e., unsubstituted (an "unsubstituted aryl") or substituted (a "substituted aryl") with one or more substituents.

"Aralkyl" is a subset of alkyl and aryl, as defined herein, and refers to an optionally substituted alkyl group substituted by an optionally substituted aryl group.

"Heteroaryl" refers to a radical of a 5- to 14-membered monocyclic or polycyclic 4n+2 aromatic ring system (e.g., having 6, 10, or 14 π electrons shared in a cyclic array) having ring carbon atoms and 1-8 ring heteroatoms provided in the aromatic ring system. "Heteroaryl" also includes ring systems wherein the heteroaryl ring, as defined above, is fused with one or more carbocyclyl or heterocyclyl groups wherein the point of attachment is on the heteroaryl ring. Unless otherwise specified, each instance of a heteroaryl group is independently optionally substituted, i.e., unsubstituted (an "unsubstituted heteroaryl") or substituted (a "substituted heteroaryl") with one or more substituents. "Heteroaralkyl" is a subset of alkyl and heteroaryl, as defined herein, and refers to an optionally substituted alkyl group substituted by an optionally substituted heteroaryl group.

"Carbocyclyl" refers to a radical of a non-aromatic cyclic hydrocarbon group having from 3 to 10 ring carbon atoms ("$C_{3-10}$ carbocyclyl") and zero heteroatoms in the nonaromatic ring system. Unless otherwise specified, each instance of a carbocyclyl group is independently optionally substituted, i.e., unsubstituted (an "unsubstituted carbocyclyl") or substituted (a "substituted carbocyclyl") with one or more substituents. Unless otherwise specified, each instance of a cycloalkyl group is independently unsubstituted (an "unsubstituted cycloalkyl") or substituted (a "substituted cycloalkyl") with one or more substituents. "Heterocyclyl" refers to a radical of a 3- to 10-membered non-aromatic ring system having ring carbon atoms and 1 to 4 ring heteroatoms, wherein each heteroatom is independently selected from nitrogen, oxygen, sulfur, boron, phosphorus, and silicon ("3- to 10-membered heterocyclyl"). In heterocyclyl groups that contain one or more nitrogen atoms, the point of attachment can be a carbon or nitrogen atom, as valency permits. A heterocyclyl group can either be monocyclic ("monocyclic heterocyclyl") or a fused, bridged or spiro ring system such as a bicyclic system ("bicyclic heterocyclyl"), and can be saturated or can be partially unsaturated.

In some embodiments, a heterocyclyl group is a 5- to 10-membered non-aromatic ring system having ring carbon atoms and 1-4 ring heteroatoms, wherein each heteroatom is independently selected from nitrogen, oxygen, sulfur, boron, phosphorus, and silicon ("5- to 10-membered heterocyclyl"). "Hetero" when used to describe a compound or a group present on a compound means that one or more carbon atoms in the compound or group have been replaced by a nitrogen, oxygen, sulfur, boron, phosphorus, and silicon heteroatom, as valency permits.

"Acyl" refers to a radical —C(O)R, wherein R is hydrogen, substituted or unsubstituted alkyl, substituted or unsubstituted alkenyl, substituted or unsubstituted alkynyl, substituted or unsubstituted carbocyclyl, substituted or unsubstituted heterocyclyl, substituted or unsubstituted aryl, or substituted or unsubstituted heteroaryl, as defined herein.

"Acylamino" refers to a radical —NRC(=O)R, wherein each instance of R is independently hydrogen, substituted or unsubstituted alkyl, substituted or unsubstituted alkenyl, substituted or unsubstituted alkynyl, substituted or unsubstituted carbocyclyl, substituted or unsubstituted heterocyclyl, substituted or unsubstituted aryl, or substituted or unsubstituted heteroaryl, as defined herein.

"Acyloxy" refers to a radical —OC(=O)R, wherein R is hydrogen, substituted or unsubstituted alkyl, substituted or unsubstituted alkenyl, substituted or unsubstituted alkynyl, substituted or unsubstituted carbocyclyl, substituted or unsubstituted heterocyclyl, substituted or unsubstituted aryl, or substituted or unsubstituted heteroaryl, as defined herein.

"Alkoxy" refers to the group —OR wherein R is substituted or unsubstituted alkyl, substituted or unsubstituted alkenyl, substituted or unsubstituted alkynyl, substituted or unsubstituted carbocyclyl, substituted or unsubstituted heterocyclyl, substituted or unsubstituted aryl, or substituted or unsubstituted heteroaryl, as defined herein.

"Carbamoyl" or "amido" refers to the radical —C(=O)NH$_2$.

"Amino" refers to the radical —NH$_2$.

"Oxo" refers to =O.

"Thioketo" refers to the group =S.

"Carboxy" refers to the radical —C(=O)OH.

"Cyano" refers to the radical —CN.

"Halo" or "halogen" refers to fluoro (F), chloro (Cl), bromo (Br), and iodo (I). The term "about" when referring to a number or a numerical range means that the number or numerical range referred to is an approximation within experimental variability (or within statistical experimental error), and thus the number or numerical range, in some instances, will vary between 1% and 15% of the stated number or numerical range.

The term "comprising" (and related terms such as "comprise" or "comprises" or "having" or "including") is not intended to exclude that in other certain embodiments, for example, an embodiment of any composition of matter, composition, method, or process, or the like, described herein, "consist of" or "consist essentially of" the described features.

In one embodiment, the electrolyte exhibits an architectural structure. In some embodiments, a polymer localized on electrode surface (either a polymer or a first portion of a polymer) exhibits a relatively higher crosslinking density in comparison with that of another polymer in the electrode pores (either another polymer or a second portion of the polymer). In some embodiments, a polymer localized on electrode surface (either a polymer or a first portion of the polymer) exhibits a relatively less flexibility in comparison with that of the polymer within pores of electrode particles (either another polymer or a second portion of the polymer). In some embodiments, a polymer localized on electrode surface has a great amount than with that of the polymer in the electrode pores. In some embodiments, pores in electrode particles do not include any polymers.

Without wishing to be bound by any theory, the potential mechanism can be explained as follows. On the one hand, a higher flexibility of the polymer among the electrode particles allows the electrode particles to move with relatively more freedoms, which may protect the electrode from cracking under extreme conditions. On the other hand, the polymer on the electrode surface may serve as a physical barrier that decreases or prevents exposure of freshly cracked electrode materials to electrolyte, particularly, flammable solvents or additives, leading to an inhibited exothermic reaction and deaccelerated thermal runaway.

In some embodiments, the polymer localized on electrode surface is structurally different from that that of the polymer within pores of electrode particles. For example, the polymer on electrode surface is different from the polymer located in pores of electrode. The polymer (e.g., from the second filling) localized on electrode surface and without penetrating pores of electrode particles, would serve as a physical barrier decreasing or preventing exposure of freshly cracked electrode materials to electrolyte. The polymer located in the electrode pores is more flexible and provides the electrode particles with more freedom to move under extreme conditions while maintaining the overall electrochemical performance of the battery under normal operations.

In some embodiments, the polymers localized on electrode surface and within pores of electrode particles share the same composition but differentiate from each other in terms of structure such as density and crosslinking density.

In certain embodiments, the polymer on electrode surface has a density higher than that located in the electrode pores.

EXAMPLES

In order that the disclosure described herein may be more fully understood, the following examples are set forth. The examples described in this application are offered to illustrate the compositions, structures, and methods provided herein and are not to be construed in any way as limiting their scope.

Example 1. Preparation of Electrolyte with Polymer Localized on Electrode Surface 1 M $LiPF_6$ in ethylene carbonate and dimethyl carbonate (1:1 by volume) were mixed to serve as a base solution.

4.375 ml of the base solution without any monomer was injected into a pouch cell followed by a resting for 48 hours at room temperature to allow the solution to be evenly distributed in the cell.

16 wt % Tris[2-(acryloyloxy)ethyl] isocyanurate (TAEI) (monomer, also termed as a crosslinker since it contains three polymerizable groups) and 8 wt % 2,2'-Azobis(2-methylpropionitrile) (AIBN) were added to the base solution and thoroughly mixed for 30 min to form a homogeneous clear solution (the monomer with a concentration of 12.9 wt % in the clear solution).

0.625 ml of the above monomer solution was injected into a pouch cell followed by a resting for 4 hours. After the resting, the pouch cell was left in the oven at 65° C. for 2 hours to enable a thermal crosslinking to polymerize the monomer into a polymer, thereby forming a polymer electrolyte with at least a portion of the polymer localized on electrode surface. Due to the short wait time and high viscosity of the solution, at least a portion of the monomer stays at the surface of electrode, but not able to penetrate inside the electrode pores. The thickness of the electrolyte is around 10 to 15 μm.

Example 2-1. Preparation of Electrolyte with Localized Polymers

A base solution of 1 M $LiPF_6$ in ethylene carbonate: dimethyl carbonate (1:1 by volume) is prepared.

A solution of 2 wt % triethylene glycol dimethacrylate (TEGDMA) (a monomer for the first filling) and 1 wt % 2,2'-Azobis(2-methylpropionitrile) (AIBN) in the base solution is formed after a thorough mixing for 30 min.

A 4.375 ml of the solution is injected into a pouch cell followed by a first resting for 48 hours at room temperature to allow the first solution to be evenly distributed in the cell.

Another solution of 16 wt % TAEI (a monomer for the second filling) and 8 wt % AIBN is prepared after a thorough mixing with the base solution for 30 min. The solution for the second filling contains a monomer concentration of 12.9 wt %.

A 0.625 ml of the solution for the second filling is injected into the pouch cell followed by a second resting for 4 hours. Due to the short resting time and high viscosity of the solution for the second filling, at least a portion of the monomer therein stays at the surface of electrode, and not penetrate inside the electrode pores.

The pouch cell is placed into an oven at 65° C. for 2 hours to enable thermal crosslinking of both monomers. A polymer electrolyte with the polymer from the second filling localized on electrode surface is formed.

Example 2-2. Preparation of Electrolyte with (Co)Polymers Localized on Electrode Surface A base solution of 1 M $LiPF_6$ in ethylene carbonate: dimethyl carbonate (1:1 by volume) is prepared.

A solution of 2 wt % triethylene glycol dimethacrylate (TEGDMA) (a monomer for the first filling) and 1 wt % 2,2'-Azobis(2-methylpropionitrile) (AIBN) in the base solution is formed after a thorough mixing for 30 min.

A 4.375 ml of the solution is injected into a pouch cell followed by a first resting for 48 hours at room temperature to allow the solution to be evenly distributed in the cell.

Another solution of 2 wt % TEGDMA (a monomer for the second filling), 16 wt % TAEI (another monomer for the second filling) and 6 wt % AIBN with the base solution is prepared after a thorough mixing for 30 min. The solution for the second filling contains a total monomer concentration of 14.5 wt %.

A 0.625 ml of the solution for the second filling is injected into the pouch cell followed by a second resting for 4 hours. Due to the short resting time and high viscosity of the solution, at least a portion of the monomers stay at the surface of electrode, but not penetrate inside the electrode pores.

The pouch cell is placed into an oven at 65° C. for 2 hours to enable thermal crosslinking of both monomers. A polymer electrolyte comprising a copolymer is formed, wherein at least a portion of the copolymer is localized on the electrode surface.

Example 2-3. Preparation of Electrolyte with Gradient Crosslinking on Electrode Surface A base solution of 1 M $LiPF_6$ in ethylene carbonate: dimethyl carbonate (1:1 by volume) is prepared.

A solution for the first filling of 2 wt % TAEI and 1 wt % 2,2'-Azobis(2-methylpropionitrile) (AIBN) in the base solution is formed after a thorough mixing for 30 min.

A 4.375 ml of the solution for the first filling is injected into a pouch cell followed by a long resting for 48 hours at room temperature to allow the solution to be evenly distributed in the cell.

Another solution of 16 wt % TAEI and 8 wt % AIBN is prepared after a thorough mixing with the base solution for 30 min. The solution for the second filling contains TAEI at a concentration of 12.9 wt %.

A 0.625 ml of the solution second filling is injected into the pouch cell followed by a short resting for 2 hours. Due to the short resting time and high viscosity of the solution, TAEI and AIBN have a relatively higher concentration on the surface of electrode.

The pouch cell is placed into an oven at 65° C. for 2 hours to enable a thermal crosslinking, which leads to a polymer electrolyte comprising a crosslinked polymer, wherein a portion of the crosslinked polymer is localized on the electrode surface. In some embodiments, a portion of the crosslinked polymer localized on the electrode surface has a higher crosslinking density than that of another portion of the crosslinked polymer located in the electrode pores. In some embodiments, the crosslink density is gradually decreased from the electrode surface toward the inner portion of the electrode.

Example 3. External Short Circuit Test

Figure 1:
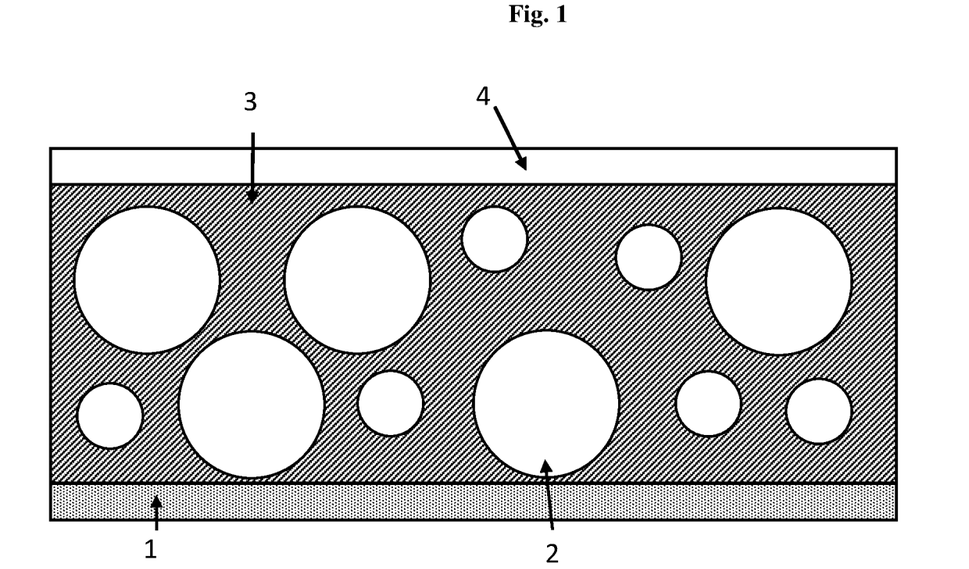
FIG. 1 is a diagram showing a representative configuration of an electrode between a polymer solid electrolyte and a current collector (1), wherein the electrode comprises particles of electroactive material (2), the pores of the electrode (among particles) (3) are filled with an electrolyte salt, and the polymer solid electrolyte comprises a polymer localized on the surface of the electrode (4).
Figure 2:
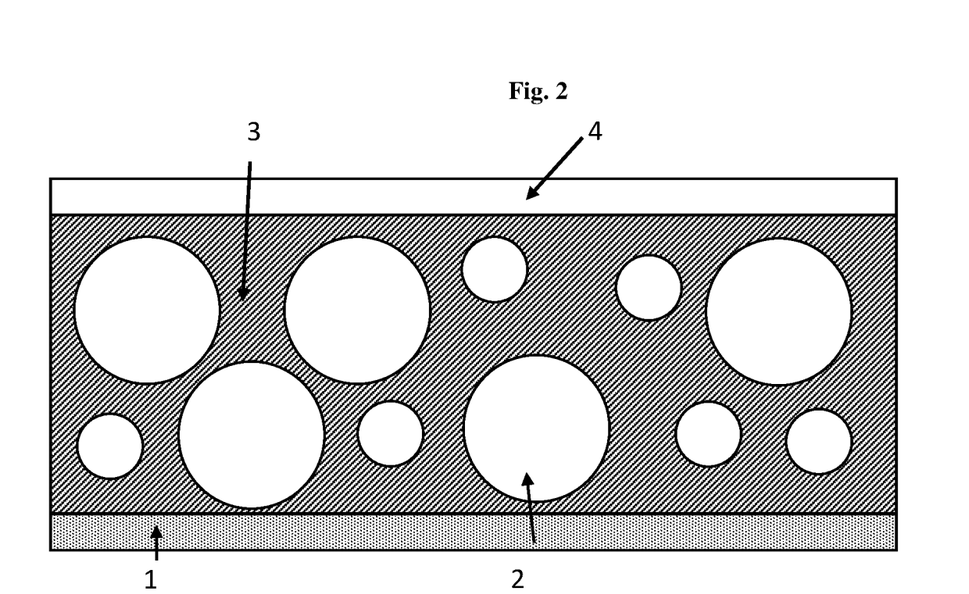
FIG. 2 is a diagram showing a representative configuration of an electrode between a polymer solid electrolyte and a current collector (1), wherein the electrode comprises particles of electroactive material (2), and the pores of the particles (3) are at least partially filled with an electrolyte salt and a polymer with a relatively low crosslink density while the surface of the electrode (4) is covered with a polymer (or another portion of the polymer) with a relatively high crosslink density.
Figure 3:
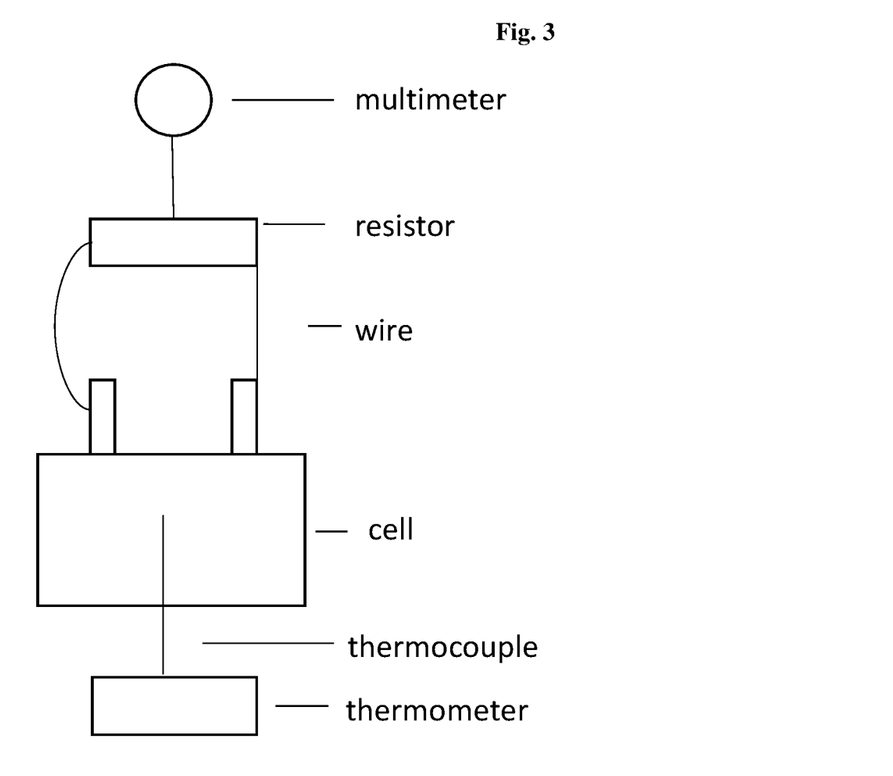
FIG. 3 is a diagram for external short circuit test.

External short circuit tests consist of short circuiting a battery from outside to simulate incorrect battery use that may cause fire or rupture. A fully charged battery's positive and negative terminals are connected to an external resistor. The real time battery voltage and current are monitored by a multimeter. The temperature of cell body is monitored by a thermometer with K-type thermocouple.

External Short Circuit Test

Ambient temperature is 17° C.; external resistance is 0.02 Ohms. The external resistance here is four times smaller than the standard requirement (0.1 Ohms for UN38.3, 0.08 Ohms for UL1642). As a result, the cell is under a more extreme abuse condition than the standard external short circuit test protocol.

TABLE 1

Result from the external short circuit tests of cells with polymer electrolytes

| Group | Discharge capacity (mAh/g) | Max current (A) | Cell max Temp. (° C.) | Results |
|---|---|---|---|---|
| The control * | 181.92 | 80 | >300 | rupture |
| Localized polymer ** | 181.58 | 75 | 140 | pass |

* The electrolyte control without polymer localized on electrode surface was prepared by mixing a monomer (1.5 wt % pentaerythritol tetraacrylate, PETA), 4M lithium salt (LiFSI), an initiator (0.1 wt % AIBN), and a plasticizer (as a solvent) by mechanical stirring at room temperature in liquid state. The mixture was injected into a pouch cell followed by a resting for 48 h. Then the pouch cell was left in the oven at 65° C. for 2 hours to enable thermal crosslinking.
** The polymer electrolyte with polymer localized on electrode surface was prepared by using the same monomer in the control but following the preparation method in sample 1.

As shown in Table 1, the control cell showed a cell body temperature of over 300° C. during the test, and the cell ruptured due to thermal runaway. The cell having a polymer electrolyte with polymer localized on electrode surface exhibited a cell maximum temperature of 140° C., which is more than 50% lower than the control. In addition, the localized polymer cell showed a maximum current of 75 A, which is 6.3% lower than that of the control cell. Furthermore, the localized polymer cell did not experience any rupture or fire during the test. Without wishing to be bond any theory, the significantly reduced maximum temperature and maximum current is mainly due to a larger interfacial resistance.

The polymer solid electrolyte in sample 1 comprises a polymer which is a homopolymer prepared by a single monomer. The polymer solid electrolyte in sample 2-1 contains two polymers (or a copolymer) from two monomers, i.e, TEGDMA is the monomer in the solution for the first filling while TAEI is the monomer in the solution for the second filling. After the polymerization, the polymer from TEGDMA (poly(TEGDMA)) is located in the electrode pores, and the polymer from TAEI (poly(TAEI)) is localized on the electrode surface. In some embodiments, in Sample 2-1, the polymer localized on electrode surface is poly (TAEI) or a mixture of poly(TAEI) and poly(TEGDMA). In some embodiments, these two monomers form a copolymer and at least a portion of the copolymer localized on the electrode surface. As representatively shown in sample 2-2, the second solution contains two different monomers and the polymer localized on electrode surface is a copolymer from two monomers, i.e., poly(TEGDMA)-poly(TAEI) copolymer. Each of samples 2-1, 2-2 and 2-3 is expected to show a safety profile like sample 1, i.e., a lower cell maximum temperature and a lower maximum current under the external short circuit test. In some embodiments, the electrochemical cells of samples 2-1, 2-2 and 2-3 exhibit a maximum temperature no higher than 35%, no higher than 40%, no higher than 45%, no higher than 50%, no higher than 55%, no higher than 60%, no higher than 70%, or no higher than 80% of the control. In some embodiments, the electrochemical cell exhibits a maximum current of at least 2%, at least 2.5%, at least 3%, at least 4%, at least 5%, at least 5%, or at least 7.5% lower than that of the control.

EQUIVALENTS

As used herein and in the appended claims, the singular forms "a," "an," and "the" include plural referents unless the context clearly dictates otherwise. Thus, for example, reference to "an agent" includes a plurality of such agents, and reference to "the cell" includes reference to one or more cells (or to a plurality of cells) and equivalents thereof known to those skilled in the art, and so forth.

While specific embodiments of the subject disclosure have been discussed, the above specification is illustrative and not restrictive. Many variations of the disclosure will become apparent to those skilled in the art upon review of this specification and the claims below. The full scope of the disclosure should be determined by reference to the claims, along with their full scope of equivalents, and the specification, along with such variations.

We claim:

1. An electrochemical cell comprising:
   a) an electrode; and
   b) a polymer solid electrolyte, comprising:
      i) an electrolyte salt;
      ii) a solvent; and
      iii) a polymer polymerized from a mixture containing the electrolyte salt, the solvent, and a monomer, wherein the polymer has at least a first portion localized on a surface of the electrode, wherein the polymer has a second portion located in pores of the electrode and the first portion of the polymer has a higher concentration of the polymer than that of the second portion in the pores of the electrode.

2. The electrochemical device of claim 1, wherein, during an external short circuit test with an external resistance of 0.02 Ohms, the electrochemical device exhibits a cell maximum temperature no higher than 50% of an electrochemical device with no polymer localized on the surface of the electrode.

3. The electrochemical device of claim 1, wherein, during an external short circuit test with an external resistance of 0.02 Ohms, the electrochemical device exhibits a maximum current at least 5% lower than that of an electrochemical device with no polymer localized on the surface of the electrode.

4. The electrochemical cell of claim 1, wherein the monomer is selected from the group consisting of poly (ethylene glycol) diacrylate with an Mn in a range from 500 to 50,000 Dalton, poly (ethylene glycol) dimethacrylate with an Mn in a range from 500 to 50,000 Dalton, triethylene glycol dimethacrylate (TEGDMA), pentaerythritol tetraacrylate (PETA), pentaerythritol tetramethacrylate (PETMA), tris [2-(acryloyloxy) ethyl] isocyanurate (TAEI), di (trimethylolpropane) tetraacrylate (Di-TMPTA), trimethylolpropane propoxylate triacrylate, trimethylolpropane trimethacrylate, pentaerythritol triacrylate, dipentaerythritol hexaacrylate, pentaerythritol tetrakis (3-mercaptopropionate), trimethylolpropane tris (3-mercaptopropionate) and a combination thereof.

5. The electrochemical cell of claim 1, wherein the polymer has a concentration in a range from 10 wt % to 40 wt % in the polymer solid electrolyte.

6. The electrochemical cell of claim 1, wherein the monomer in the mixture comprises a first monomer and a second monomer at a weight ratio in a range from about 1:10 to about 10:1.

7. The electrochemical cell of claim 1, wherein the electrolyte salt is selected from the group consisting of lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-metasulfonate (LiCF$_3$SO$_3$), lithium bistrifluoromethanesulfonimidate (LiN(CF$_3$SO$_2$)$_2$, LiFSI), lithium bis(oxalato)borate (LiBOB), lithium nitrate (LiNO$_3$), lithium fluoroalkyl-phosphates (Li[PF$_x$(C$_y$F$2_{y+1-z}$H$_z$)$_{6-x}$]) ($1 \leq x \leq 5$, $1 \leq y \leq 8$, and $0 \leq z \leq 2y-1$), lithium bisperfluoro-ethysulfonylimide(LiBETI), lithium bis(trifluoromethanesulphonyl) imide, lithium bis(fuorosulphonyl)imide, lithium trifluoromethanesulfonimide (LiTFSI), lithium bis(fluorosulfonyl)imide (LiBFSI), lithium difluoro(oxalato)borate (LiDFOB), LiC (CF$_3$SO$_2$)$_3$, LiF, LiCl, LiBr, LiI, Li$_2$SO$_4$, Li$_3$PO$_4$, Li$_2$CO$_3$, LiOH, lithium acetate, lithium trifluoromethyl acetate, lithium oxalate and a mixture thereof.

8. The electrochemical cell of claim 1, wherein the solvent is selected from the group consisting of diethyl ether, dimethoxy methane, diethoxy methane, dimethoxy ethane, 1,2-diethoxyethane, 1,1-diethoxyethane, 1,1-dipropoxyethane, 1,2-dipropoxyethane, diethylene glycol, 2-(2-ethoxyethoxy) ethanol, diethylene glycol dimethyl ether, diethylene glycol diethyl ether, diethylene glycol dibutyl ether, triethylene glycol, tri(ethylene glycol)monomethyl ether, tri(ethylene glycol)monoethyl ether, tri(ethylene glycol) monobutyl ether, triethylene glycol dimethyl ether, triethylene glycol diethyl ether, triethylene glycol dibutyl ether, tetraethylene glycol, tetra(ethylene glycol)monomethyl ether, tetra(ethylene glycol)monoethyl ether, tetra(ethylene glycol)monobutyl ether, tetraethylene glycol dimethyl ether, tetraethylene glycol diethyl ether, tetraethylene glycol dibutyl ether, tetrahydrofuran, dioxolane, tetrahydropyran, 1,4-dioxane, 1,3-dioxane, ethylene carbonate, diethyl carbonate, dimethyl carbonate, ethyl methyl carbonate, propylene carbonate, fluoroethylene carbonate, vinylene carbonate, succinonitrile, glutaronitrile, hexanenitrile, malononitrile, dimethyl sulfoxide, 1,3-propane sultone, sulfolane, ethyl vinyl sulfone, vinyl sulfone, methyl vinyl sulfone, phenyl vinyl sulfone, N-propyl-N-methylpyrrolidinium bis(fluorosulfonyl) imide, N-butyl-N-methylpyrrolidinium bis(fluorosulfonyl) imide, N-propyl-N-methylpiperidinium bis(fluorosulfonyl) imide, 1-methyl-1-(2-methoxyethyl) pyrrolidinium bis(fluorosulfonyl) imide, 1-ethyl-3-methylimidazolium bis(fluorosulfonyl) imide, trimethyl phosphate, triethyl phosphate, poly (ethylene oxide), and any combination thereof.

9. A method for preparing an electrochemical cell, comprising:
    a) preparing a base solution comprising an electrolyte salt, a solvent and a monomer;
    b) loading the base solution onto an electrode followed by a resting, after which at least a portion of the monomer stays on the surface of the electrode; and
    c) after the resting, polymerizing the monomer therein into a polymer, thereby obtaining an electrochemical cell which contains a polymer solid electrolyte comprising at least a first portion of the polymer localized on a surface of the electrode and a second portion located in pores of the electrode, wherein the first portion of the polymer has a higher concentration of the polymer than that of the second portion in the pores of the electrode.

10. The method of claim 9, wherein the mixture has a dynamic viscosity no less than 100 cP.

11. The method of claim 9, wherein the resting lasts for a period no longer than 12 hours.

12. An electrochemical cell, comprising:
    a) an electrode; and
    b) a polymer solid electrolyte comprising:
        i) a first polymer localized on a surface of the electrode, wherein the first polymer is synthesized from a first mixture containing a first monomer, and
        ii) a second polymer located in pores of the electrode, wherein the second polymer is synthesized from a second mixture containing a second monomer.

13. The electrochemical cell of claim 12, wherein the second polymer located in the pores of the electrode has a greater amount than the first polymer localized on surface of the electrode.

14. The electrochemical cell of claim 12, wherein the first mixture contains both TEGDMA and TAEI.

15. The electrochemical cell of claim 12, wherein the first polymer and the second polymer are covalently connected to each other.

16. A method for preparing the electrochemical cell of claim 12, comprising:
    a) preparing a first mixture comprising a first monomer;
    b) preparing a second mixture comprising a second monomer;
    c) loading the second mixture onto an electrode followed by a first resting which allows a full diffusion of the second monomer into pores of the electrode;
    d) loading the first mixture onto the electrode after loading the second mixture followed by a second resting; and
    e) after the second resting, polymerizing the first and second monomers on the electrode into a first and second polymers, respectively, thereby obtaining an electrochemical cell of claim 14, wherein the electrochemical cell contains a polymer solid electrolyte comprising both the first and second polymers, wherein the second polymer is located in pores of the electrode while the first polymer is localized on a surface of the electrode.

17. The method of claim 16, wherein the first mixture has a viscosity higher than that of the second mixture and restricts diffusion of the first monomer into the pores of the electrode during the second resting.

18. The method of claim 16, wherein the first resting lasts for no less than 2 days and the second resting lasts for no more than 12 hours.

* * * * *